United States Patent Office 3,463,474
Patented Aug. 26, 1969

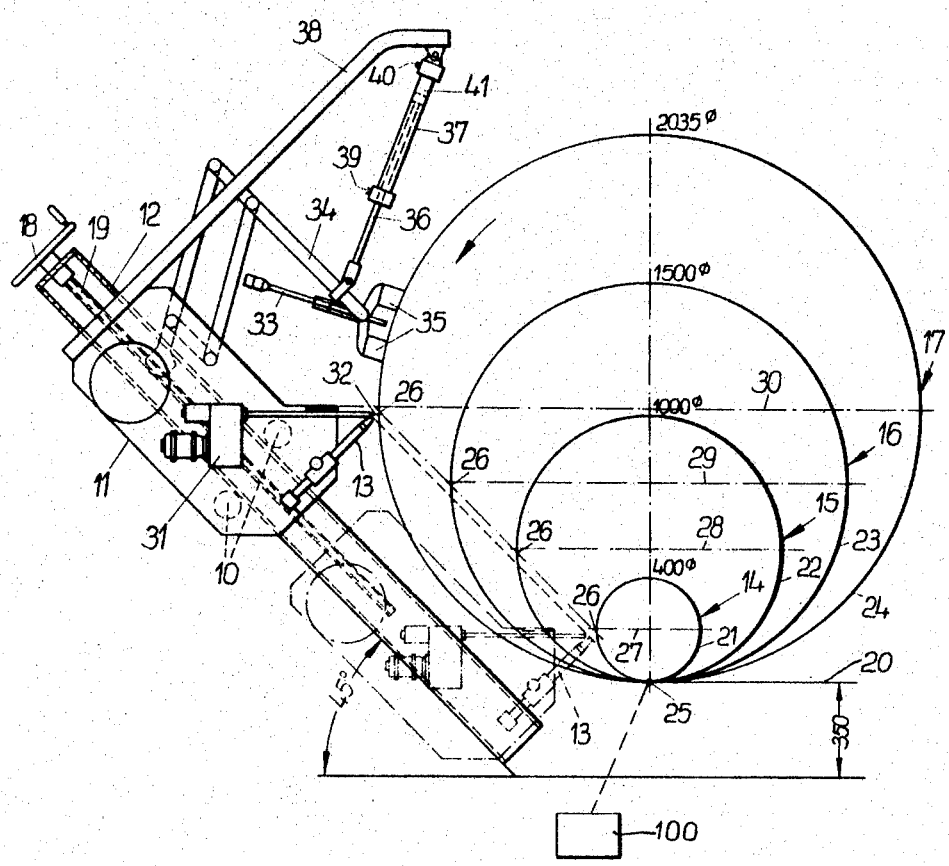

3,463,474
DEVICE FOR SECTIONING CONTINUOUSLY WELDED PIPE COILS
Sebastian Muller, Gernsheim, Ewald Klarner, Frankfurt am Main, and Horst Wagner, Frankfurt am Main-Hochst, Germany, assignors to Messer Griesheim G.m.b.H., Frankfurt am Main, Germany, a corporation of Germany
Filed Jan. 17, 1967, Ser. No. 609,906
Claims priority, application Germany, Jan. 18, 1966, M 68,034
Int. Cl. F23d *13/32*
U.S. Cl. 266—23                                                7 Claims

ABSTRACT OF THE DISCLOSURE

A cutting torch is arranged for the same forward advance as the pipe with the pipe rotation permitting the cutting of the pipe to proceed. For accommodating different diameter pipes, the torch can be set in its desired position along a line 45° to the plane at which each pipe has a line of contact common to the other pipes.

BACKGROUND OF THE INVENTION

The invention relates to a device for the sectioning of continuously welded pipe coils during their preparation.

It is known to use the chip treatment to cut such pipes. In the chip treatment, the workpiece machine is moved in the longitudinal direction of the pipe with its longitudinal advance. The workpiece machine employed therein is of extensive weight which presents considerable difficulties, particularly in coordinating the workpiece machine advance with the continuous longitudinal advance of the pipe coil. A further disadvantage is in the strong cutting forces of the cutting mechanism on the pipe, which results in the need for relatively greater guidance of the pipe. Furthermore, above all, the cutting time in such a treatment is of considerably long duration.

SUMMARY OF INVENTION

The object of the invention is to avoid the above disadvantages and also to achieve the advantages described below.

In accordance with this invention a cutting torch is arranged at the pipe coil and, with respect to its longitudinal axis, has the same advance as the pipe with the turning movement required for the production of the pipe coil serving as the cutting advance. The cutting forces directed from a cutting torch to the workpiece are negligible so that the holding devices for the cutting tool can be constructed of relatively simple design and low cost. Accordingly the extensive conventional means side guidance of the pipe coil is thereby also no longer necessary. In this sense a support consisting of several rollers is entirely sufficient. The duration of the cutting and thus the duration of the longitudinal movement of the cutting device is considerably shorter due to the cutting speed's being increased manyfold as compared to the free-cutting treatment. This enables also the cutting of shorter pipe lengths besides enabling the decrease in size of the equipment.

On the basis of the natural light weight of torch cutting equipment, it is thereby relatively simple to coordinate the longitudinal advance of the torch and drill. For example, the torch with its auxiliary devices can be mounted on a vertical plate with the drill disposed in a depression therein. The plate is clamped to the pipe by pneumatically operated radial clamping jaws and is taken along with it for the duration of the cutting process.

An advantageous further embodiment of the invention is particularly adapted for the torch cutting of pipe coils of various diameters. In this embodiment the pipes always touch a common line with their metal surfaces, rather than being concentric. The cutting torch is movable in a plane at an angle of about 45° to the tangential plane of the common line of contact of the pipe casing surfaces.

The essential advantage of this embodiment is that the torch can be infinitely adjusted by a simple movement along this inclined plane to any desired pipe diameter. Additionally the cutting torch can be arranged on a carriage which is conveyable along a carrier member situated in this inclined plane and transversely to the longitudinal axis of the pipe.

The carriage can be moved by a motor or manually, for example, with the aid of a shaft. The track for the carriage wheel need not be particularly smooth or even, since the carriage remains fixed in position during the cutting process—once it is adjusted to a definite pipe diameter. Thus, the customary standardized rolled section can suitably serve as the carrier member.

The cutting torch mounted on the carriage basically can be directed to any desired point of the pipe casing surface at any desired angle. The torch can be turnable and—to be movable on the carriage as by means of a rock and pinion. It is preferred, however, that the cutting jet which is at about an angle of 45° to the pipe casing surface, be directed to a point on the pipe casing about 20–50 mm. below the plane passing through the pipe center and parallel to the tangential plane of the line of contact.

By the slanted hit of the cutting jet on the pipe surface at the beginning of the cutting process, the so-called grooving (a too extensive widening of the groove opening) is advantageously avoided. A further advantage of the above-named novel step is the sharp, acute angled edge of this groove opening situated in the direction of the cut which makes possible a good notch.

Since the pipe coil is constantly turned, a quick puncture of the cutting jet is required, however, which can occur only after an intensive preheating of the section hit. For obtaining this quick preheating of the starting point of the cut, an ignition wire is arranged at the cutting torch. The advance of the wire is controlled in accordance with the wall strength of the pipe coil.

For activating the ignition wire, a device can successfully be used which for instance serves for MIG welding.

According to another embodiment of the invention, a preheating torch is arranged with the cutting torch for preheating the starting point of the cut. This preheating torch revolves with the pipe coil until it reaches about the height of the cutting torch.

The preheating torch is suitably moved back along a predetermined path opposite the turning direction of the pipe. The path depends on the wall strength of the pipe, its rotating speed, material, and the intensity of the preheating flame. In any case, the spot hit must be preheated at the height of the cutting torch in such a manner that the grooving and the cutting process can begin immediately.

For conducting the preheating torch, it may be hinged to a rod connected to the carriage and mounted by electromagnets or the like to the pipe coil.

The release of the preheating torch at the starting point of the preheating process suitably takes place in such a manner that a cylinder is arranged between the preheating torch and carriage. The cylinder contains a movable pressure-admitting plunger which in turn is connected with the preheating torch to move the torch toward the direction of rotation of the pipe.

In this connection, where gas is the pressure means, the spring effect of the gas, e.g. air, in the cylinder and conduit can be advantageously utilized and regulated by respective throttle recesses in the cylinder.

BRIEF DESCRIPTION OF DRAWINGS

The drawing shows an embodiment of the invention, in schematic form wherein both the ignition wire device as well as a preheating torch are indicated.

DETAILED DESCRIPTION

According to the drawing, a carriage 11 provided with wheels 10 is conveyably arranged along a carrier member 12. Carriage 11 supports the cutting torch 13. Carrier member 12 is attached to an element by conventional means (not shown) to the particular pipe coil 14–17. Carriage 11 can be moved by hand by means of a hand-operated wheel 18 and a shaft 19. Carrier member 12 is arranged at a 45° angle to the level or horizontal tangential plane 20 to facilitate a smooth adjusting of the cutting torch 13 to pipes of different diameters, e.g. pipes from small diameter pipe 14 to large diameter pipe 17. For this purpose the pipes (e.g. 14–17) are arranged in such a manner that their casing surfaces 21–24 touch each other at a common line, with contact point 25 as indicated in the drawing. This line lies in the tangential plane 20.

Cutting torch 13—also at about a 45° angle—is directed to a point 26 on the pipe casing surface 21 or 22 or 23 or 24 which is situated 20–50 mm. below a plane through the pipe center and parallel to plane 20. These pipe center planes are indicated as 27–30. The thus achieved sharp cutting joint edge enables an effortless cutout of the cutting joint.

The embodiment shown in the drawing includes an ignition wire advance device 31 on carriage 11 which feeds an ignition wire 32 to the cutting torch 13 for the acceleration of the preheating process.

For preheating the starting point, a preheating torch 33 can also be employed as by being hinged to a rod 34 connected with carriage 11. The preheating torch 33 is detachably fixed by electromagnets 35 to the pipe casing surface 24 and during the preheating processing rotates with the pipe 17 toward the cutting torch 13. Upon reaching torch 13, the preheating process must come to an end. A pressure-admitting plunger 36, which is movably arranged in a cylinder 37 serves for releasing the preheating torch 33. The cylinder is hinged to a bar 38 which is connected to carriage 11 and is provided with a pressure joint 39. A gas, preferably air, serves as the pressure means. In releasing the preheating torch 33 into its position, shown in the drawing, the spring action of the air in the cylinder and its connection can be utilized advantageously, since the air is compressed through pipe 17 during the carrying along of the preheating torch. In order to assure an exact dosage of the release movement of the preheating torch 33, the cylinder 37 is provided with a throttle recess 40 through which the air contained in the cylinder chamber 41 is released.

Any suitable turning means may be used. Accordingly, the turning means is merely schematically shown in the drawing by reference numeral 100.

Obviously many modifications and variations of this invention are possible in light of the above teachings. It is therefore to be understood that within the scope of the appended claims the invention may be practiced otherwise than specifically described.

What is claimed is:

1. A device for sectioning continuously welded pipe coils comprising means for moving the coils in a longitudinal direction, turning means for rotating the coils, a cutting torch disposed toward the surface of the coils, means for moving said torch in a longitudinal direction at the same forward advance as the coils while maintaining said torch stationary with respect to the rotational movement of the coils whereby the rotational movement facilitates a circumferential cutting of the coils, said longitudinal coil moving means moving each coil regardless of its diameter along a common line in a plane tangential with the lowermost point on the cross-sectional surface of each coil, said torch moving means including means for moving said cutting torch in a plane disposed at a 45° angle to said tangential plane.

2. A device as set forth in claim 1 wherein said torch moving means includes a carrier part disposed in a plane perpendicular to the lontudinal axis of the coils, a carriage movable in said carrier part, and said torch being mounted on said carriage.

3. A device as set forth in claim 1 wherein the longitudinal axis of each coil is disposed in a plane parallel to said tangential plane, and said cutting torch being positioned to cut the surface of each coil at a point from 20 to 50 mm. below said longitudinal axis plane.

4. A device as set forth in claim 1 wherein an ignition wire is mounted adjacent said cutting torch to facilitate preheating the starting point of cut.

5. A device as set forth in claim 2 including a preheating torch rotationally movable toward said cutting torch.

6. A device as set forth in claim 5 wherein a rod is mounted on said carriage, said preheating torch being hinged to said rod, and electromagnet means mounting said preheating torch against the coil.

7. A device as set forth in claim 6 wherein a piston-cylinder assembly is mounted between said preheating torch and said carriage for moving said preheating torch toward and away from the coil.

References Cited

UNITED STATES PATENTS

| | | | |
|---|---|---|---|
| 2,560,738 | 7/1951 | Patterson | 266—23 |
| 3,076,641 | 2/1963 | Fullerton et al. | 266—23 |

J. SPENCER OVERHOLSER, Primary Examiner

R. D. BALDWIN, Assistant Examiner